US012375634B2

(12) United States Patent
Fasogbon et al.

(10) Patent No.: US 12,375,634 B2
(45) Date of Patent: Jul. 29, 2025

(54) METHOD, AN APPARATUS AND A COMPUTER PROGRAM PRODUCT FOR SPATIAL COMPUTING SERVICE SESSION DESCRIPTION FOR VOLUMETRIC EXTENDED REALITY CONVERSATION

(71) Applicant: Nokia Technologies Oy, Espoo (FI)

(72) Inventors: Peter Oluwanisola Fasogbon, Tampere (FI); Emre Baris Aksu, Tampere (FI); Igor Danilo Diego Curcio, Tampere (FI); Yu You, Kangasala (FI); Lukasz Kondrad, Munich (DE); Sujeet Shyamsundar Mate, Tampere (FI); Saba Ahsan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 278 days.

(21) Appl. No.: 18/151,722

(22) Filed: Jan. 9, 2023

(65) Prior Publication Data

US 2023/0239453 A1 Jul. 27, 2023

(30) Foreign Application Priority Data

Jan. 21, 2022 (FI) .................................. 20225048

(51) Int. Cl.
*H04N 13/194* (2018.01)
*H04L 65/1069* (2022.01)
*H04N 13/00* (2018.01)
(52) U.S. Cl.
CPC ....... *H04N 13/194* (2018.05); *H04L 65/1069* (2013.01); *H04N 2013/0092* (2013.01)

(58) Field of Classification Search
CPC ......... H04N 13/194; H04N 2013/0092; H04N 23/60; H04N 13/00; H04L 65/1069; H04L 65/70; H04L 65/765
See application file for complete search history.

(56) References Cited

FOREIGN PATENT DOCUMENTS

WO    WO 2018/222229      *  6/2018  ......... H04N 21/2368
WO       2018/222229 A1     12/2018
(Continued)

OTHER PUBLICATIONS

"New Study Item on eXtended Reality (XR) in 5G", 3GPP TSG SA Meeting #81, SP-180667, Agenda: 19, Qualcomm Incorporated, Sep. 12-14, 2018, 3 pages.
(Continued)

*Primary Examiner* — Yosef K Laekemariam
(74) *Attorney, Agent, or Firm* — McCarter & English LLP

(57) ABSTRACT

There is disclosed an apparatus and a method for spatial computing service session description for volumetric XR conversation. In accordance an embodiment the method comprises receiving volumetric video from a plurality of sources, the volumetric video data comprising color images and depth images representing at least a part of a scene; determining which of the plurality of sources belong to a same group; selecting a group identifier for the group; associating the volumetric video with the group identifier indicative of from which group the volumetric video data is received; associating the volumetric video with a source identifier indicative of from which source of the group the volumetric video data is received; associating the color image of the volumetric video with a color data identifier; and associating the depth image of the volumetric video with a depth data identifier.

18 Claims, 9 Drawing Sheets

(56) References Cited

FOREIGN PATENT DOCUMENTS

| WO | 2022/074294 A1 | 4/2022 | | |
|---|---|---|---|---|
| WO | WO 2022/074294 | * | 4/2022 | ............. G06T 19/00 |

OTHER PUBLICATIONS

"Committee Draft of MPEG Immersive Video", Video, ISO/IEC JTC1/SC29/WG11, N19482, Jul. 3, 2020, 82 pages.

Abdelazeem et al., "Multi-sensor point cloud data fusion for precise 3D mapping", The Egyptian Journal of Remote Sensing and Space Sciences, vol. 24, No. 3, Part 2, Dec. 2021, pp. 835-844.

Arun et al., "Least-Squares Fitting of Two 3-D Point Sets", IEEE Transactions on Pattern Analysis and Machine Intelligence, vol. PAMI-9, No. 5, Sep. 1987, pp. 698-700.

"Information technology—Coded representation of immersive media (MPEG-I)—Part 8: Network Based Media Processing", ISO/IEC JTC1/SC29/WG11, ISO 23090-8:2018, 2018, 49 pages.

"Multisensor Fusion", Environmental Data Exchange Network for Inland Water, 2007, pp. 1-12.

"IEEE Standard for a Precision Clock Synchronization Protocol for Networked Measurement and Control Systems", IEEE Instrumentation and Measurement Society, IEEE Std 1588™-2019, Nov. 7, 2019, 498 pages.

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding of moving video, Recommendation ITU-T H.265, Feb. 2018, 692 pages.

"Information technology—Coded Representation of Immersive Media—Part 5: Video-based Point Cloud Compression", ISO/IEC JTC 1/SC 29/WG 11, ISO/IEC 23090-5, 2019, 102 pages.

"H.323", Wikipedia, Retrieved on Feb. 3, 2023, Webpage available at : https://en.wikipedia.org/wiki/H.323.

Begen et al., "SDP: Session Description Protocol", RFC 8866, Internet Engineering Task Force (IETF), Jan. 2021, pp. 1-57.

Schulzrinne et al., "RTP Profile for Audio and Video Conferences with Minimal Control", RFC 3551, Network Working Group, Jul. 2003, pp. 1-44.

Wang et al., "RTP Payload Format for H.264 Video", RFC 6184, Internet Engineering Task Force (IETF), May 2011, pp. 1-101.

Wang et al., "RTP Payload Format for High Efficiency Video Coding (HEVC)", RFC 7798, Internet Engineering Task Force (IETF), Mar. 2016, pp. 1-86.

Handley et al., "SDP: Session Description Protocol", RFC 4566, Network Working Group, Jul. 2006, pp. 1-49.

Office action received for corresponding Finnish Patent Application No. 20225048, dated Sep. 23, 2022, 10 pages.

"Test Model 11 for MPEG Immersive Video", ISO/IEC JTC1/SC29/WG4, N0142, Oct. 29, 2021, 53 pages.

"3rd Generation Partnership Project; Technical Specification Group Services and System Aspects; Extended Reality (XR) in 5G (Release 16)", 3GPP TR 26.928, V2.0.0, Mar. 2020, 132 pages.

* cited by examiner

METHOD, AN APPARATUS AND A COMPUTER PROGRAM PRODUCT FOR SPATIAL COMPUTING SERVICE SESSION DESCRIPTION FOR VOLUMETRIC EXTENDED REALITY CONVERSATION

TECHNICAL FIELD

The present solution generally relates to an apparatus and a method for spatial computing service session description for volumetric extended reality (XR) conversation.

BACKGROUND

Volumetric video data represents a three-dimensional (3D) scene or object, and can be used as input for AR (Augmented Reality), VR (Virtual Reality), XR (Extended Reality) and MR (Mixed Reality) applications. Such data describes geometry (shape, size, position in 3D space) and respective attributes (e.g., color, opacity, reflectance, . . . ), and any possible temporal transformations of the geometry and attributes at given time instances (like frames in 2D video). Volumetric video can be generated from 3D models, also referred to as volumetric visual objects, i.e., CGI (Computer Generated Imagery), or captured from real-world scenes using a variety of capture solutions, e.g., multi-camera, laser scan, combination of video and dedicated depth sensors, and more. Also, a combination of CGI and real-world data is possible. Examples of representation formats for volumetric data comprise triangle meshes, point clouds, or voxels. Temporal information about the scene can be included in the form of individual capture instances, i.e., "frames" in 2D video, or other means, e.g., position of an object as a function of time.

Volumetric capture technology is a technique that digitizes a three-dimensional space (i.e., the volume of space), object, or environment in real-time using an array of cameras set around a target. The use of RGB-D cameras (red-green-blue-depth) is particularly popular thanks to accuracy in the depth images from some RGB-D cameras. Such RGB-D cameras depict an object or a scene and the captured RGBD information is digitized (e.g a point cloud is created), and the digitized information is transferred to a web, a mobile device or devices, and/or to virtual worlds to be viewed in three-dimensional (3D) format. What makes volumetric video interesting is that the final product may not have a set of fixed viewpoints, so the end-user can watch and interact with the content by freely viewing it from different (even all possible) angles or positions, enhancing their experience and heightening their sense of immersion and engagement.

FIG. 3 illustrates an architecture that can be used to support XR volumetric conversation that utilizes a management server MS. The K1, K2, K3, K4 and K5 are capture devices 301, for example devices that capture texture (RGB) plus depth (D), i.e. RGB-D, information of a scene. The capture devices 301 are in fixed positions (i.e. world locked). Each capture device sends video (RGB-D) and metadata (e.g. camera intrinsic and extrinsic information) from a single capture position (e.g., for capturing a person) in the scene via corresponding capture server 302 (e.g. CS1, CS2) to the management server 303 (e.g. MS). Video and metadata information allow to reenact/reproduce the capture scene at a viewer's 304 side.

One problem in this kind of system is that all capture devices are used without taking into account the position of the Viewer. Hence, the bandwidth and computation resources may be wasted for data that are invisible to the end viewer. Furthermore, excessive cameras may introduce extra noise.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

For XR volumetric conversation system, a digitalization approach is creating the 3D representation of an object (e.g. represented by point clouds or meshes) which are then transferred through the network. Sending high resolution 3D objects even after the use of highly compressible methods can still lead to higher computational complexity or higher latency at the receiver's end. Such an approach may also lead to higher end to end latency which is an important parameter in conversational or low latency unidirectional applications, in computationally constrained devices. As a result, it may be more appealing in certain scenarios to directly send compressed RGB-D data which can reduce latency and computational complexity where higher bandwidth connectivity is available. Thereafter, the RGB-D data can be transformed to an appropriate 3D representation (e.g. point cloud or mesh) at the receiver end or on the cloud based on predefined viewing capability. Indeed, this kind of approach, i.e., sending RGB-D instead of 3D representation (e.g. point cloud or mesh) may provide highly compressible solutions, thanks to advances in MPEG compression algorithms for color and depth images. This approach might greatly reduce the bandwidth for XR conversation system.

In addition, there is no current method for indicating that a particular set of depth and color video streams are associated with each other (e.g., providing RGB-D data for a given capture position). There is a need to have a mechanism to describe the semantic connection between the depth and color video streams to enable appropriate handling at the receiver.

According to some embodiments, there is provided a system and/or an apparatus, which includes spatial computing service for real-time XR volumetric conversation use case.

According to some embodiments there is provided a method of a session description for specifying the spatial computing service to produce highly efficient volumetric conversational service.

According to some embodiments there is provided a method of data fusion through spatial grouping of media data streams.

According to some embodiments it is possible to avoid the usage of the capture servers CS1 and CS2 from an architecture presented on FIG. 3 in order to create a less complex XR volumetric conversational system setup from a viewer's perspective (i.e who will consume the data). There is a benefit in enabling end-to-end conversational XR where the individual depth and image sensors (RGB-D cameras etc.) in a given location need not know about their location.

In accordance with an embodiment, the capture devices will directly send RGB-D streams (or MIV representations)

from a camera onboard software to a media service located on a cloud. The cloud service can contain location-based synchronization which may try to ensure accurate manipulation of arriving streams, and their relevant spatial grouping.

In addition, an embodiment is disclosed regarding a session description file to enable the architecture and proper functioning of the whole system.

Multi-sensor data fusion is a technique to solve variety of computer vision problems where complete field information can be established from various partial ones. It may help overcome the limitations of a single sensor and may enable a complete structure required for various tasks such as object classification, detection and 3D representation. This idea spans ranges from 2D problems to 3D and even 4D domain of applications.

According to an approach, a data fusion algorithm optimally combines sensor data from a terrestrial and an unmanned aerial system (UAS) to obtain an improved and a complete 3D mapping model of a structure. This approach may be utilized in the architecture of FIG. 3 whereby all images from the UAS are assumed that they are in the same area, which makes it easy to get their point clouds projection first, then perform alignments. Methods such as Iterative Closest Point (ICP) can also be used to find an appropriate alignment parameters from those point clouds, through finding some form of consistent curvatures in the point cloud data.

According to another approach, neural network techniques are utilized to simplify these problems further in that images can be aligned together and thus there is no need for intermediate 3D point cloud projection before alignment. The utilization of neural network may provide some form of spatial grouping information from various capture data, by extracting real features from raw image sources.

According to a first aspect, there is provided an apparatus comprising means for
  receiving volumetric video from a plurality of sources, the volumetric video data comprising color images and depth images representing at least a part of a scene;
  determining which of the plurality of sources belong to a same group;
  selecting a group identifier for the group;
  associating the volumetric video with the group identifier indicative of from which group the volumetric video data is received;
  associating the volumetric video with a source identifier indicative of from which source of the group the volumetric video data is received;
  associating the color image of the volumetric video with a color data identifier; and
associating the depth image of the volumetric video with a depth data identifier.

According to a second aspect, there is provided a method comprising
  receiving volumetric video from a plurality of sources, the volumetric video data comprising color images and depth images representing at least a part of a scene;
  determining which of the plurality of sources belong to a same group;
  selecting a group identifier for the group;
  associating the volumetric video with the group identifier indicative of from which group the volumetric video data is received;
  associating the volumetric video with a source identifier indicative of from which source of the group the volumetric video data is received;
  associating the color image of the volumetric video with a color data identifier; and
associating the depth image of the volumetric video with a depth data identifier.

According to a third aspect, there is provided an apparatus comprising at least one processor, memory including computer program code, the memory and the computer program code configured to, with the at least one processor, cause the apparatus to perform at least the following:
  receive volumetric video from a plurality of sources, the volumetric video data comprising color images and depth images representing at least a part of a scene;
  determine which of the plurality of sources belong to a same group;
  select a group identifier for the group;
  associate the volumetric video with the group identifier indicative of from which group the volumetric video data is received;
  associate the volumetric video with a source identifier indicative of from which source of the group the volumetric video data is received;
  associate the color image of the volumetric video with a color data identifier; and
  associate the depth image of the volumetric video with a depth data identifier.

According to fourth aspect, there is provided computer program product comprising computer program code configured to, when executed on at least one processor, cause an apparatus or a system to
  determine which of the plurality of sources belong to a same group;
  select a group identifier for the group;
  associate the volumetric video with the group identifier indicative of from which group the volumetric video data is received;
  associate the volumetric video with a source identifier indicative of from which source of the group the volumetric video data is received;
  associate the color image of the volumetric video with a color data identifier; and
associate the depth image of the volumetric video with a depth data identifier.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment in included in at least one embodiment of the disclosure.

Figure 1:
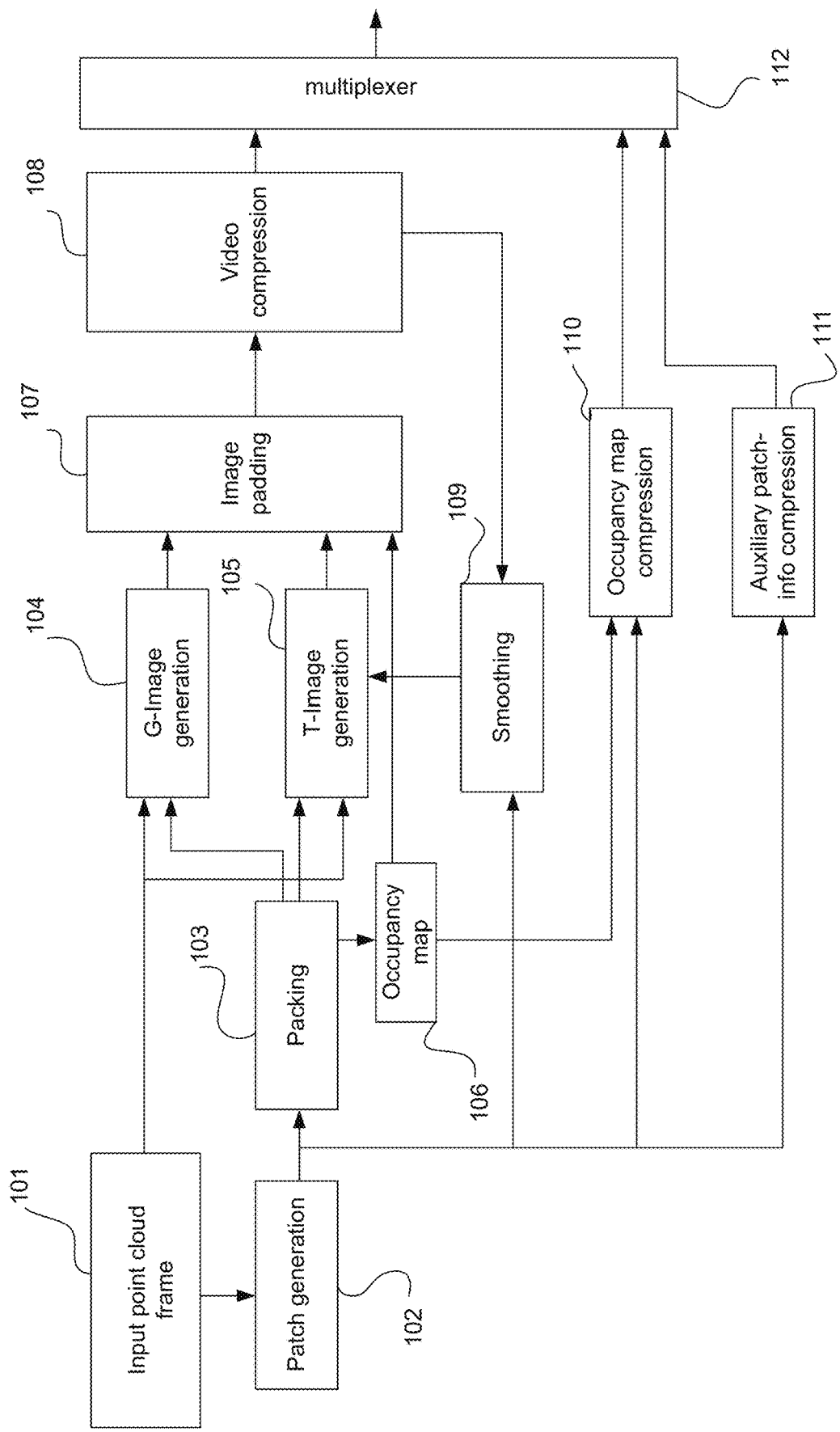
FIG. 1 shows an example of a compression process of a volumetric video.

FIG. 1 illustrates an overview of an example of a compression process of a volumetric video. Such process may be applied for example in MPEG Video-based Point Cloud Coding (V-PCC). The process starts with an input point cloud frame 101 that is provided for patch generation 102, geometry image generation 104 and texture image generation 105.

The patch generation 102 process aims at decomposing the point cloud into a minimum number of patches with smooth boundaries, while also minimizing the reconstruction error. For patch generation, the normal at every point can be estimated. An initial clustering of the point cloud can then be obtained by associating each point with one of the following six oriented planes, defined by their normals:

(1.0, 0.0, 0.0),
(0.0, 1.0, 0.0),
(0.0, 0.0, 1.0),
(−1.0, 0.0, 0.0),
(0.0, −1.0, 0.0), and
(0.0, 0.0, −1.0)

More precisely, each point may be associated with the plane that has the closest normal (i.e., maximizes the dot product of the point normal and the plane normal).

The initial clustering may then be refined by iteratively updating the cluster index associated with each point based on its normal and the cluster indices of its nearest neighbors. The final step may comprise extracting patches by applying a connected component extraction procedure.

Patch info determined at patch generation 102 for the input point cloud frame 101 is delivered to packing process 103, to geometry image generation 104 and to texture image generation 105. The packing process 103 aims at mapping the extracted patches onto a 2D plane, while trying to minimize the unused space, and guaranteeing that every T×T (e.g., 16×16) block of the grid is associated with a unique patch. It should be noticed that T may be a user-defined parameter. Parameter T may be encoded in the bitstream and sent to the decoder.

The used simple packing strategy iteratively tries to insert patches into a W×H grid. W and H may be user-defined parameters, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current resolution image can fit a patch, then the height H of the grid may be temporarily doubled, and search is applied again. At the end of the process, H is clipped so as to fit the used grid cells.

The geometry image generation 104 and the texture image generation 105 are configured to generate geometry images and texture images respectively. The image generation process may exploit the 3D to 2D mapping computed during the packing process to store the geometry and texture of the point cloud as images. In order to better handle the case of multiple points being projected to the same pixel, each patch may be projected onto two images, referred to as layers. For example, let H(u, y) be the set of points of the current patch that get projected to the same pixel (u, v). The first layer, also called a near layer, stores the point of H(u, v) with the lowest depth D0. The second layer, referred to as the far layer, captures the point of H(u, v) with the highest depth within the interval [D0, D0+Δ], where Δ is a user-defined parameter that describes the surface thickness. The generated videos may have the following characteristics:

Geometry: W×H YUV420-8 bit,
Texture: W×H YUV420-8 bit,

It is to be noticed that the geometry video is monochromatic. In addition, the texture generation procedure exploits the reconstructed/smoothed geometry in order to compute the colors to be associated with the re-sampled points.

The geometry images and the texture images may be provided to image padding 107. The image padding 107 may also receive as an input an occupancy map (OM) 106 to be used with the geometry images and texture images. The occupancy map 106 may comprise a binary map that indicates for each cell of the grid whether it belongs to the empty space or to the point cloud. In other words, the occupancy map (OM) may be a binary image of binary values where the occupied pixels and non-occupied pixels are distinguished and depicted respectively. The occupancy map may alternatively comprise a non-binary image allowing additional information to be stored in it. Therefore, the representative values of the DOM (Deep Occupancy Map) may comprise binary values or other values, for example integer values. It should be noticed that one cell of the 2D grid may produce a pixel during the image generation process. Such an occupancy map may be derived from the packing process 103.

The padding process 107 aims at filling the empty space between patches in order to generate a piecewise smooth image suited for video compression. For example, in a simple padding strategy, each block of T×T (e.g., 16×16) pixels is compressed independently. If the block is empty (i.e., unoccupied, i.e., all its pixels belong to empty space), then the pixels of the block are filled by copying either the last row or column of the previous T×T block in raster order. If the block is full (i.e., occupied, i.e., no empty pixels), nothing is done. If the block has both empty and filled pixels (i.e., edge block), then the empty pixels are iteratively filled with the average value of their non-empty neighbors.

The padded geometry images and padded texture images may be provided for video compression 108. The generated images/layers may be stored as video frames and compressed using for example the HM16.16 video codec according to the HM configurations provided as parameters. The video compression 108 also generates reconstructed geometry images to be provided for smoothing 109, wherein a smoothed geometry is determined based on the reconstructed geometry images and patch info from the patch generation 102. The smoothed geometry may be provided to texture image generation 105 to adapt the texture images.

The patch may be associated with auxiliary information being encoded/decoded for each patch as metadata. The auxiliary information may comprise index of the projection plane, 2D bounding box, 3D location of the patch.

For example, the following metadata may be encoded/decoded for every patch:
  index of the projection plane
    Index 0 for the planes (1.0, 0.0, 0.0) and (−1.0, 0.0, 0.0)
    Index 1 for the planes (0.0, 1.0, 0.0) and (0.0, −1.0, 0.0)
    Index 2 for the planes (0.0, 0.0, 1.0) and (0.0, 0.0, −1.0)
  2D bounding box (u0, v0, u1, v1)
  3D location (x0, y0, z0) of the patch represented in terms of depth δ0, tangential shift s0 and bitangential shift r0. According to the chosen projection planes, (δ0, s0, r0) may be calculated as follows:
    Index 0, δ0=x0, s0=z0 and r0=y0
    Index 1, δ0=y0, s0=z0 and r0=x0
    Index 2, δ0=z0, s0=x0 and r0=y0
  Also, mapping information provided for each T×T block its associated patch index may be encoded as follows:
    For each T×T block, let L be the ordered list of the indexes of the patches such that their 2D bounding box contains that block. The order in the list is the same as the order used to encode the 2D bounding boxes. L is called the list of candidate patches.
    The empty space between patches is considered as a patch and is assigned the special index 0, which is added to the candidate patches list of all the blocks.
    Let I be index of the patch, which the current T×T block belongs to, and let J be the position of I in L. Instead of explicitly coding the index I, its position J is arithmetically encoded instead, which leads to better compression efficiency.

The occupancy map consists of a binary map that indicates for each cell of the grid whether it belongs to the empty space or to the point cloud. One cell of the 2D grid produces a pixel during the image generation process.

The occupancy map compression 110 leverages the auxiliary information described in previous section, in order to detect the empty T×T blocks (i.e., blocks with patch index 0). The remaining blocks may be encoded as follows: The occupancy map can be encoded with a precision of a B0×B0 blocks. B0 is a configurable parameter. In order to achieve lossless encoding, B0 may be set to 1. In practice B0=2 or B0=4 results in visually acceptable results, while significantly reducing the number of bits required to encode the occupancy map.

The compression process may comprise one or more of the following example operations:
  Binary values may be associated with B0×B0 sub-blocks belonging to the same T×T block. A value 1 associated with a sub-block, if it contains at least a non-padded pixel, and 0 otherwise. If a sub-block has a value of 1 it is said to be full, otherwise it is an empty sub-block.
  If all the sub-blocks of a T×T block are full (i.e., have value 1). The block is said to be full. Otherwise, the block is said to be non-full.
  A binary information may be encoded for each T×T block to indicate whether it is full or not.
  If the block is non-full, an extra information indicating the location of the full/empty sub-blocks may be encoded as follows:
  Different traversal orders may be defined for the sub-blocks, for example horizontally, vertically, or diagonally starting from top right or top left corner
  The encoder chooses one of the traversal orders and may explicitly signal its index in the bitstream.
  The binary values associated with the sub-blocks may be encoded by using a run-length encoding strategy.
    The binary value of the initial sub-block is encoded.
    Continuous runs of 0s and 1s are detected, while following the traversal order selected by the encoder.
    The number of detected runs is encoded.
    The length of each run, except of the last one, is also encoded.

Figure 2:
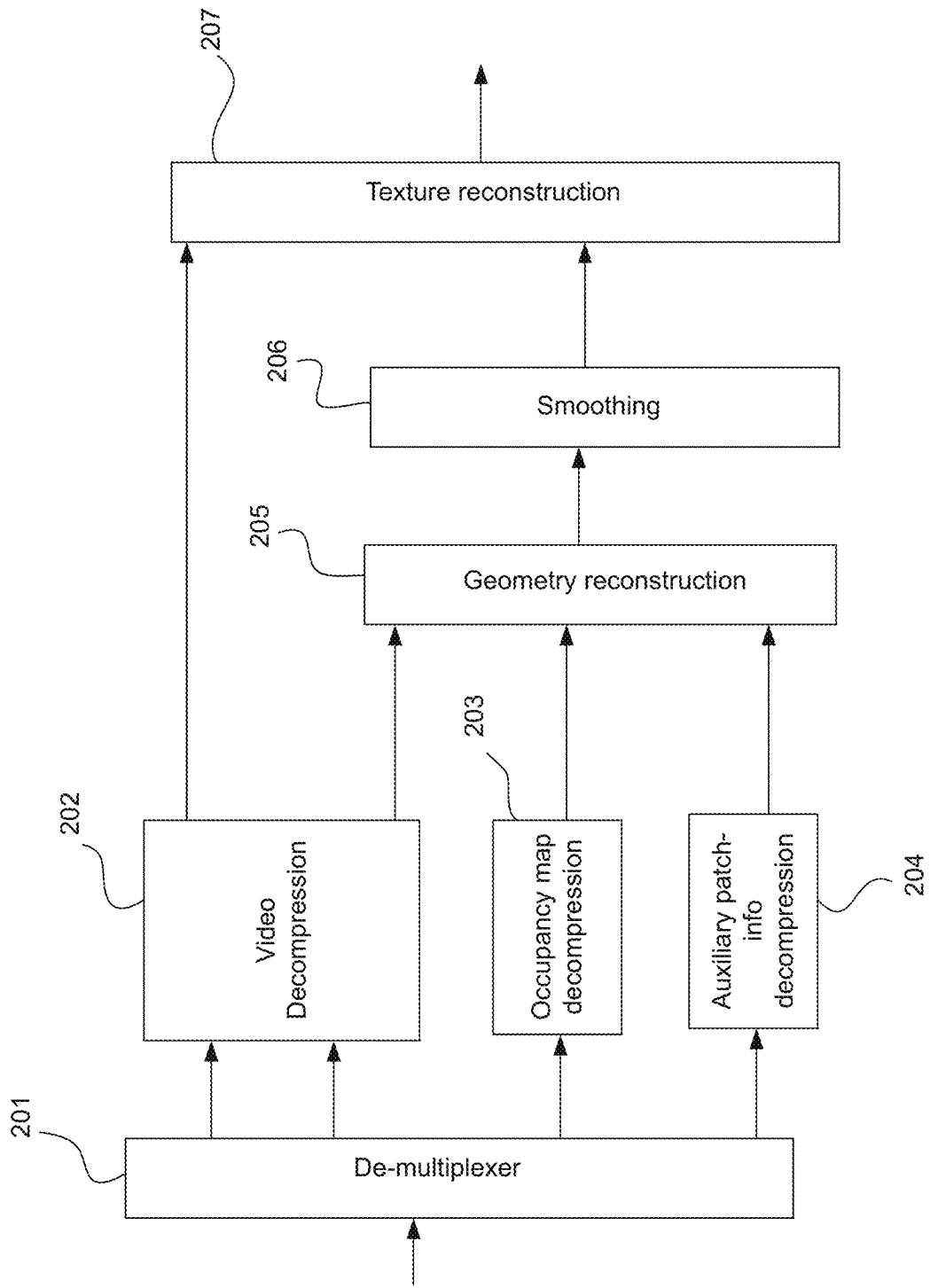
FIG. 2 shows an example of a de-compression process of a volumetric video.
Figure 3:
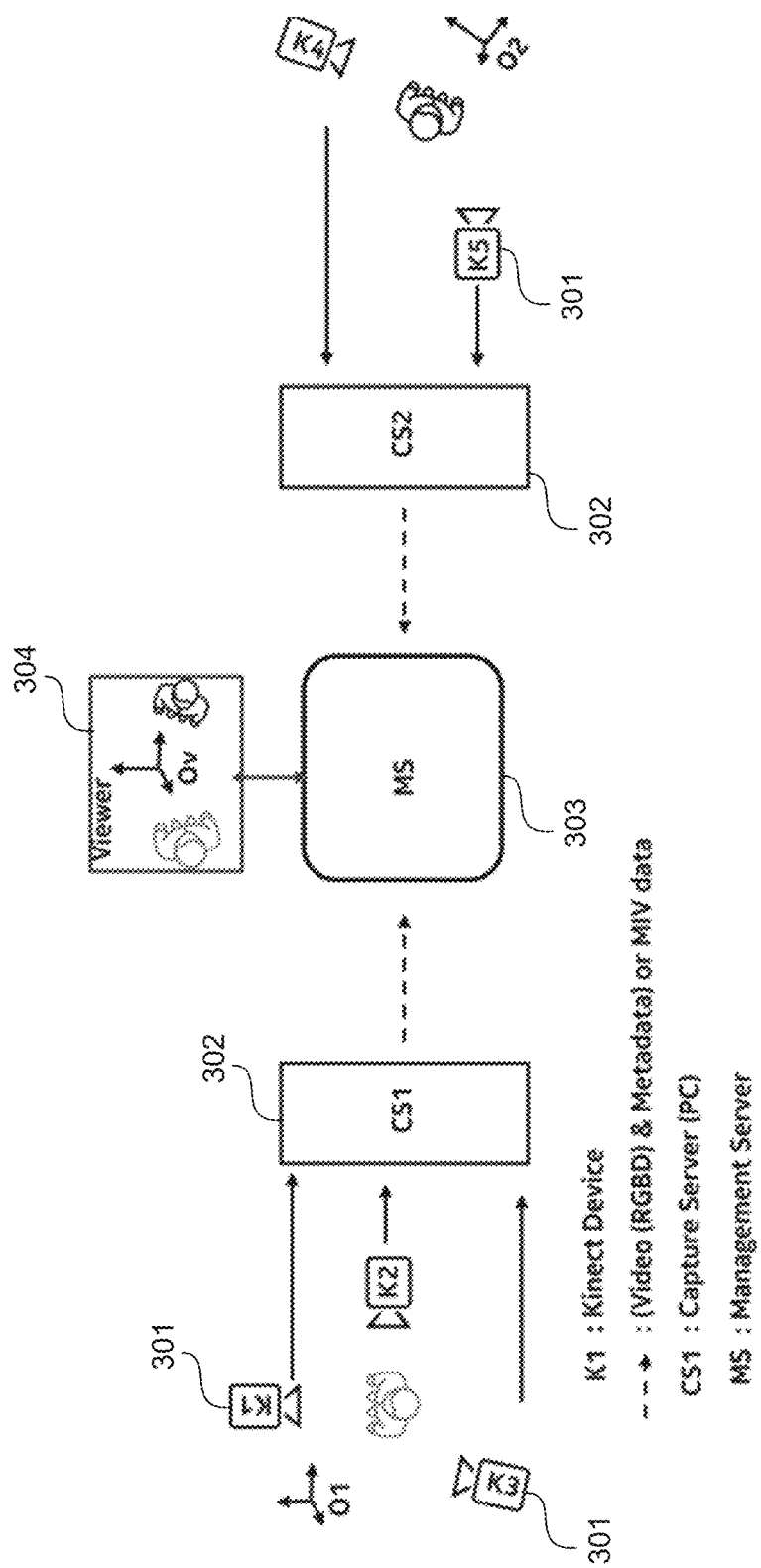
FIG. 3 illustrates an architecture that can be used to support XR volumetric conversation that utilizes a management server.

FIG. 2 illustrates an overview of a de-compression process for MPEG Video-based Point Cloud Coding (V-PCC). A de-multiplexer 201 receives a compressed bitstream, and after de-multiplexing, provides compressed texture video and compressed geometry video to video decompression 202. In addition, the de-multiplexer 201 transmits compressed occupancy map to occupancy map decompression 203. It may also transmit a compressed auxiliary patch information to auxiliary patch-info compression 204. Decompressed geometry video from the video decompression 202 is delivered to geometry reconstruction 205, as are the decompressed occupancy map and decompressed auxiliary patch information. The point cloud geometry reconstruction 205 process exploits the occupancy map information in order to detect the non-empty pixels in the geometry/texture images/layers. The 3D positions of the points associated with those pixels may be computed by leveraging the auxiliary patch information and the geometry images.

The reconstructed geometry image may be provided for smoothing 206, which aims at alleviating potential discontinuities that may arise at the patch boundaries due to compression artifacts. The implemented approach moves boundary points to the centroid of their nearest neighbors. The smoothed geometry may be transmitted to texture reconstruction 207, which also receives a decompressed texture video from video decompression 202. The texture reconstruction 207 outputs a reconstructed point cloud. The texture values for the texture reconstruction are directly read from the texture images.

The point cloud geometry reconstruction process exploits the occupancy map information in order to detect the non-empty pixels in the geometry/texture images/layers. The 3D positions of the points associated with those pixels are computed by levering the auxiliary patch information and the geometry images. More precisely, let P be the point associated with the pixel (u, v) and let (δ0, s0, r0) be the 3D location of the patch to which it belongs and (u0, v0, u1, v1) its 2D bounding box. P can be expressed in terms of depth δ(u, v), tangential shift s(u, v) and bi-tangential shift r(u, v) as follows:

$$\delta(u,v)=\delta 0+g(u,v)$$

$$s(u,v)=s0-u0+u$$

$$r(u,v)=r0-v0+v$$

where g(u, v) is the luma component of the geometry image.

For the texture reconstruction, the texture values can be directly read from the texture images. The result of the decoding process is a 3D point cloud reconstruction.

In one example, the video and metadata information can be represented according to MPEG immersive video (MIV) format, defined in ISO/IEC 23090-12, such that each camera geometry (comprising the depth image) and texture (comprising the color image) information can be represented by one or more patches in one atlas, or can be represented by independent atlases.

In the following, some embodiments will be described in more detail with reference to the arrangement of FIG. 4 and the flow diagram of FIG. 5.

Figure 4:
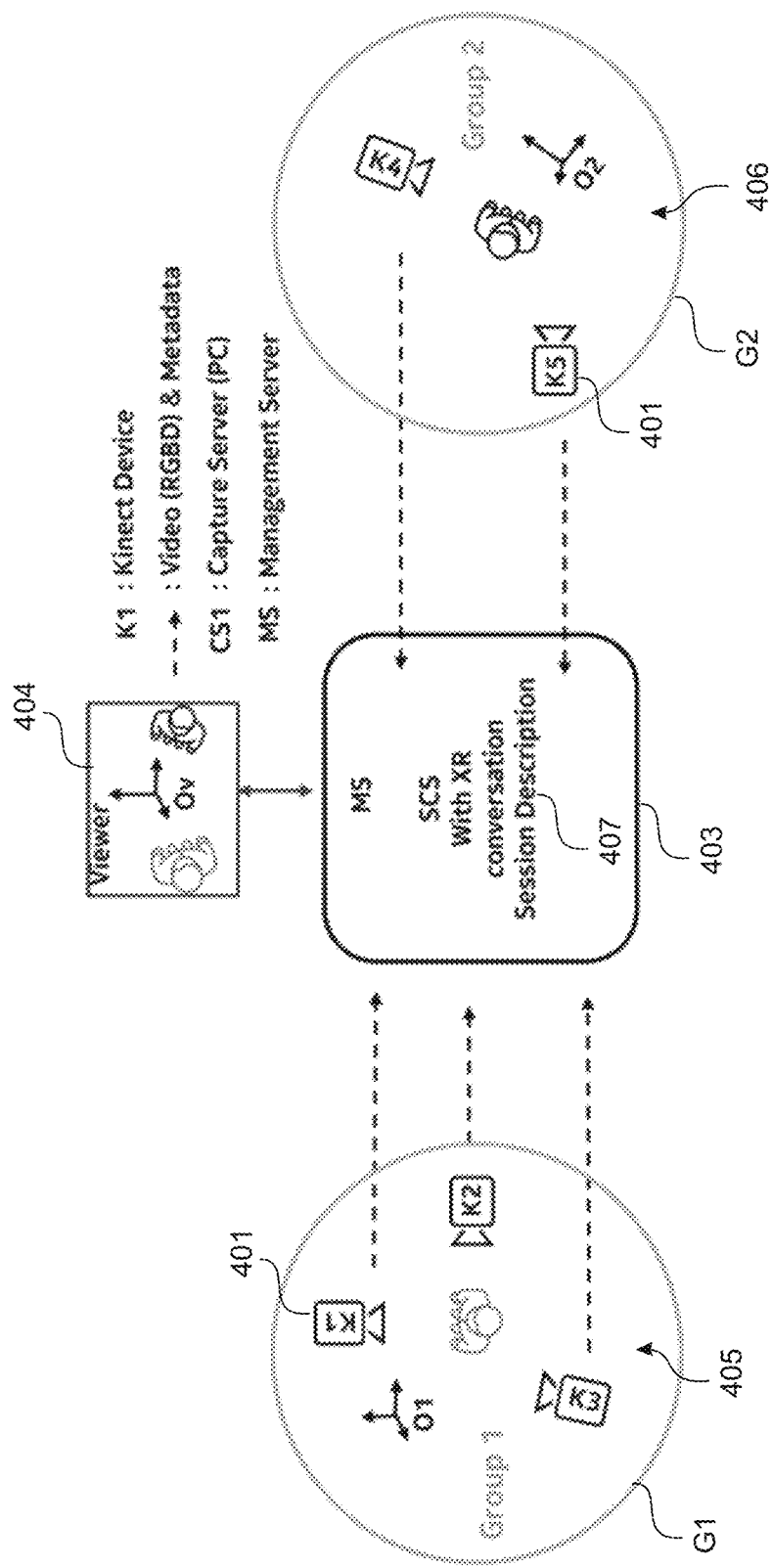
FIG. 4 illustrates a cloud based architecture arrangement according to an embodiment suitable for volumetric XR conversation system.

FIG. 4 illustrates a cloud based architecture arrangement according to an embodiment suitable for volumetric XR conversation system. In this architecture, multiple devices 401 (also referred with K1, K2, . . . ,K5 in this specification) at multiple locations 405, 406 may stream data directly to a spatial computing server 403 (also referred with SCS in this specification). The spatial computing server SCS receives the stream data and determines spatial grouping attributes of the connected devices K1, K2, . . . , K5. After the determination the spatial computing server SCS may send stream data to a viewer device 404, wherein the viewer device 404 may then reenact/reproduce the scene. Alternatively, the spatial computing server SCS may stream the output directly to the viewer device 404.

The spatial computing server SCS may have received intrinsic and extrinsic parameters from the devices K1, K2, . . . , K5. Based on the extrinsic parameters the spatial computing server SCS determines that the devices K1, K2 and K3 are located nearby each other and that the devices K4 and K5 are located nearby but at a location different from the location where the devices K1, K2 and K3 are located. Thus, in this example situation, the spatial computing server SCS has grouped the devices K1, K2 and K3 together to form a first group G1 and the devices K4 and K5 to form a second group G2.

Some of the devices 401 may have been installed to a volumetric multi-camera rig wherein the mutual position and/or pose of the devices may not change. Still each of the devices may be able to communicate with the spatial computing server SCS individually. Those devices attached with the same rig may be grouped as one group or these devices may be a part of a greater group of devices.

In the following, it is assumed that the devices K1 to K5 have at least a camera for capturing images and/or video and may also have audio capturing elements as well.

In addition to the architecture, a spatial computing service (SCS) session description file is described, in accordance with an embodiment. This kind of spatial computing service session description file may be used with the architecture. All needed information to compose the volumetric scene may be provided, signaled and updated as a part of the spatial computing service session description file. This session description may relay signaling information and metadata from senders through a spatial computing server SCS to receivers participating in a call, for example.

According to an embodiment, the spatial computing service session description 407 may be used for signaling a volumetric contribution source session description and negotiation for low latency transmission. The signaling indicates which media streams correspond to the depth and texture for each of the contributing sources. Furthermore, the signaling indicates if one or more volumetric contribution sources belong to a common volumetric reconstruction zone. An attribute called vcsrc_group in this specification is provided to group the one or more media streams from a contributing source and another grouping attribute called svcs_group in this specification to indicate the spatial grouping of the one or more volumetric contribution sources.

The attribute vcsrc_group (Volumetric Contribution SouRCe), which may be provided as additional session level parameters comprise media identifiers for each of the related media line from a transmission sensor. In case there are multiple sensors behind a physical transmission device, the vcsrc_group also carries the intrinsic and extrinsic parameters as additional parameters with this grouping information. The intrinsic and extrinsic parameters may carry information related to cameras of a group. The intrinsic parameters represent e.g. an optical center and focal length of a camera and the extrinsic parameters represent e.g. the location and pose of a camera in a 3D scene. Such a parameter groups all the media streams corresponding to a single capture position (e.g., RGB is media stream 1, D is media stream 2). This informs the receiver that the RGB and Depth data are to be processed together for generating a volumetric representation.

The attribute svcs_group (Spatial Volumetric reConstruction of Sources) also carries the extrinsic parameters related to the multiple contributing sources if they can be determined by the spatial computing server. In accordance with an embodiment, the extrinsic parameters may be signaled for each of the grouping as comma separated base64 encoded values, for example. The intrinsic parameters can be signaled as a media level attribute for each of the contributing media lines (i.e. media stream in the vcsrc_group). This higher level grouping parameter may be introduced to indicate the set of volumetric media contributing sources (e.g., a grouping parameter which groups the RGB & D grouping) in case of a pass-through mode where all the reconstruction is done only at the receiver.

Thus, the metadata provided by the spatial computing service session description file may allow easy access by a viewer through the spatial computing service session description.

This kind of spatial computing service session description may make it easy to accept various standardized video and image formats as inputs, thus making the approach generic.

The spatial computing service session description may allow signaling the metadata flow in and out of the system from several locations at a particular instance during a call session. For example, when a call is initiated, all participating devices are registered at a negotiation and sign-in phase to enable different level of call capabilities. In accordance with an embodiment, it is at this stage that the spatial computing service session description file is created which signifies agreement for the participating devices. This spatial computing service session description file may be updated regularly during the call to relay directives and signaling between senders and receiver through the spatial computing server SCS.

As a result, it will be straightforward that each of the devices is connected to a media server which will allow seamless synchronization defined in a spatial computing service session description file, and monitor the seamless flow of the metadata for an XR volumetric conversation. The description of the invention and its proper functioning are dependent on the metadata structure, the media service commands and options, which also host the SCS description file, 3D reconstruction process, then the delivery of that information between server and sender/receiver.

According to an embodiment, the spatial computing server SCS receives 501 volumetric video from a plurality of sources. The volumetric video data comprises color images and depth images representing at least a part of a scene. The spatial computing server SCS determines 502 which of the plurality of sources belong to a same group and selects 503 a group identifier for the group. The spatial computing server SCS associates 504 the volumetric video with the group identifier indicative of from which group the volumetric video data is received and associates 505 the volumetric video with a source identifier indicative of from which source of the group the volumetric video data is received. The spatial computing server SCS further associates 506 the color image of the volumetric video with a color data identifier and associates 507 the depth image of the volumetric video with a depth data identifier.

In the following, some further details regarding the spatial computing service session description will be provided, in accordance with an embodiment.

For the metadata two example implementations are explained. Indeed, the metadata should be implemented in such a way that it follows standardized media formats for possible signaling in the session description.

3D video metadata can be represented as binary format that may allow high compression ratio for real-time raw volumetric recordings. In accordance with an embodiment, the multimedia file may be partitioned into one or more segments. A simple example of such implementation for the data structure is shown below in which the 3D video metadata is represented in chunk format:

Chunk Format Representation
  ##Chunk data sent infrequently
    0 Group Index //Volumetric capture group volumetric_capture_group
    1 Intrinsic
    2 Extrinsic //Local extrinsic between color image and depth image
    3 Video Info
  #Chunk data sent frequently for each frame
    4 Batch Info //Enable accurate synchronization on server.
    5 Frame //Keyframe
      Data (Variables) //camera GUID, accelerometer etc
      Image (Variable) //Compressed image data
      Depth (Variable) //Compressed depth data
    6 Audio
      Data (Variables)

The frame, batch info and audio chunk are sent frequently, whereas calibration parameters, video info and group index are sent infrequently usually at the call-in negotiation phase except if a viewer made some runtime requests during in-call.

In the example above the data related to the infrequent chunk is as follows:

Group index specifies an empty container that can hold the spatial grouping indicator for a camera which is to be handled by the media server.

Intrinsic indicates the internal camera calibration parameters (such as focal length, principal point, and lens distortions)

Extrinsic indicates the rotation and translation that may be needed to transform the color image to depth image planes and vice versa. In the transmission stage for these chunks, each frame can be transmitted in the form of video batches.

Video Info are video compression specific parameters which can be used to specify compression type, video type, width, and height. Usually, this information is exchanged in the beginning of the call, unless otherwise runtime live requests can be made by viewer for necessary adjustment.

The audio capture position information can be delivered together with the infrequent chunk information. In some embodiments, the audio microphone positions can be delivered as an offset value with respect to the visual capture apparatus. This offset can be signaled, e.g., in terms of translation and rotation offsets.

In the example above the data related to the frequent chunk is as follows:

Batch Info can include a parameter to specify the maximum number of frames that will be sent as a part of the video batch. It can also include the local time stamp for the video frame, exposure time etc. This information may be useful by the server to synchronize the video with the other data streams.

Frames are the compressed color and depth data from a single perspective in the multi-camera rig. It may also include data variables for their camera parameters, such as a camera index, accelerometer, exposure, brightness, saturation etc.

Audio is data which is delivered as frequent chunks to deliver the multipoint capture of the audio scene. The audio data may be delivered in any other suitable format (e.g., AMR-WB, EVS, etc.).

In an embodiment, the information above may be signaled using other transport protocols, such as the IETF Session Description Protocol or via the Real-Time Protocol using RTCP or an RTP payload format.

This may mean that the spatial computing server SCS, which may also be called a media server, should allow and/or signal and/or create a spatial grouping attribute for all the devices K1, . . . , K5 involved so that all cameras from the same multi-camera rig are grouped together, as was already mentioned above. The spatial computing server SCS may thus be used as the entity for creating the spatial computing service session description file, which may also be called as an SCS session description. The SCS session description file can be deployed in any media server (or capture server).

In the following, some details of the creation of the spatial computing service session description file will be provided, in accordance with an embodiment.

Figure 6:
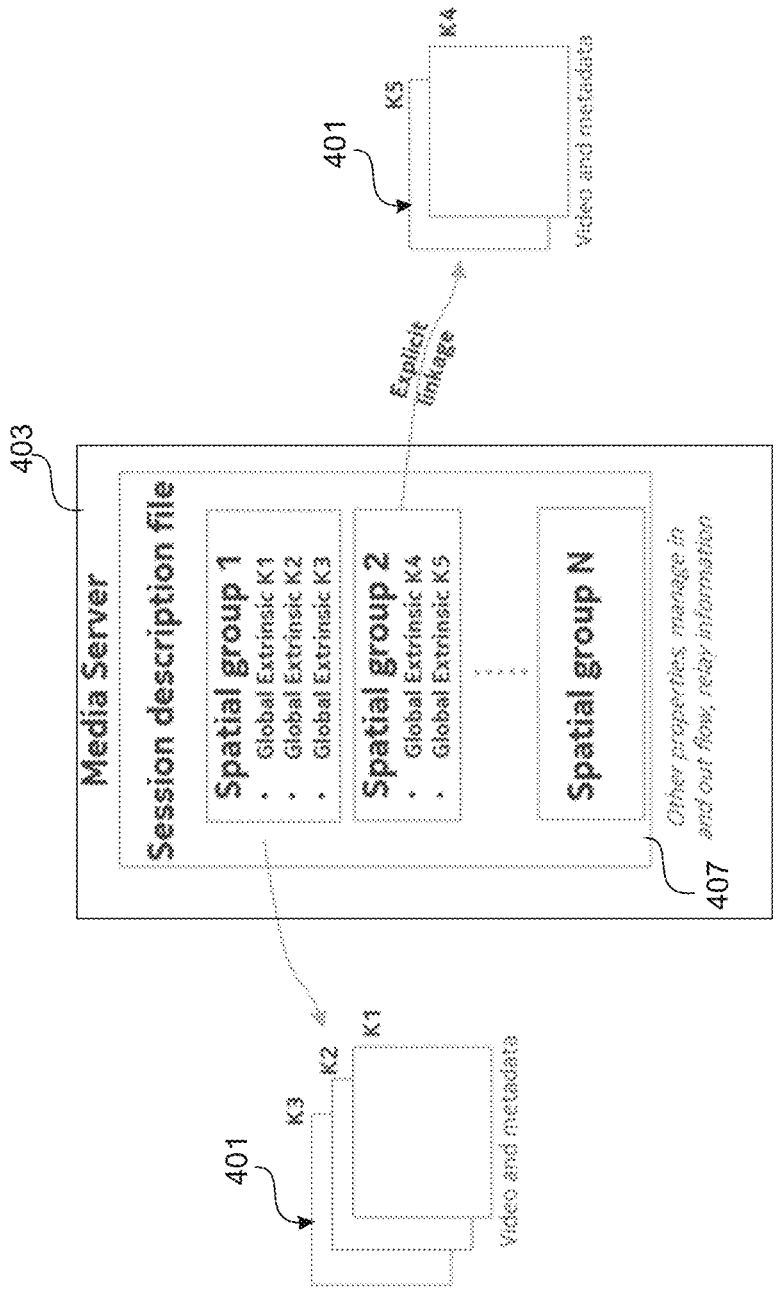
FIG. 6 shows an example of a high-level representation of the spatial computing service session description file which includes a space for spatial group information, in accordance with an embodiment.

The SCS session description file may be used to determine when the architecture is used for XR conversation purposes. The SCS session description can be implemented with json or linkage format files that can directly link to entries specified in the 3D video metadata. It is worth noting that this SCS session description file may not hold the metadata itself but just provides explicit link through structural representation. FIG. 6 is a high-level representation of the SCS session description file which includes a space for spatial group information. The spatial computing server SCS will determine a proper index for the spatial grouping, then append it on the metadata flowing in before transmission to a viewer.

With this approach, the SCS session description file can be made quite simple, which allows the 3D video metadata file to retain its original form. This approach may make this file generic to be widely deployed on various media server architectures or standards. The global extrinsic parameter in the SCS session description file should be estimated for each group. This can be done, e.g., by an appropriate computer vision algorithm located in the spatial computing server SCS. Each global extrinsic contain rotation and translation parameters needed to transform all the camera that belongs to the same group to a common coordinate system origin. For the case where the viewer needs to reenact the scene, this session description file may be transmitted in addition to the video data so that the viewer can have access to the extrinsic parameter(s) for each spatial group.

The spatial computing server SCS may group multiple media streams (or 3D video metadata) together for semantical understanding. For example, the streams from cameras K1, K2 and K3 in FIG. 4 would form a Spatial Group 1 and K4 and K5 would form a Spatial Group 2. As a result, the Group Index can be used in a Session Description Protocol (SDP) for grouping the media streams. For example, a special group parameter called "Volumetric_capture_group" (e.g svcs_group) can be used as follows:

"Volumetric_capture_group"=mid_K1_rgb mid_K2_rgb mid_K1_depth mid_K2_depth . . .

where mid_K1_rgb is the mid of the RGB video stream from the first camera device K1 and mid_K1_depth is the mid of the depth media stream from the first camera device K1. In an embodiment, the streams may require synchronization and the synchronization anchor can be the first media stream in the list, for example. The volumetric_capture_group parameter indicates that the cameras are capturing the same physical space and the media streams can be combined by the cloud server or the receiver for generating 3D reconstruction.

In the following, some details regarding determination of group id will be described, in accordance with an embodiment.

The group id parameter or the volumetric_capture_group (e.g svcs_group) parameter can be estimated using a neural network method. A suitable approach may be to learn features from streamed video data (RGB-D), then using a neural based method to classify the learned features into location specific. To improve the approach, the neural network can be trained to extract features from both depth and colors representing a human in the scene as a reference object. However, one constraint in this approach is that all cameras must be oriented towards the center of the scene for it to be validated. In addition, the spatial computing server SCS can include a module to normalize the cameras intensity and exposure to improve the result. For the appropriate time synchronization of the arriving data streams, it can be assumed that the devices are equipped with hardware containing accurate synchronization board based on IEEE 1588 PTP protocol. Thereafter, the timing information can be improved further in the spatial computing server SCS thanks to the time stamp delivered as a part of the metadata.

In another implementation embodiment, for volumetric visual capture accompanied with distributed audio capture, the audio data from the multiple microphones is analyzed to determine if they belong to a common audio scene. This can be used as a lower complexity coarse spatial grouping. The coarse grouped capture cameras are subsequently analyzed to determine precise volumetric capture groups.

In the following, an example of a technical implementation of an XR volumetric call will be provided. Also some details how the 3D scene can be reenacted using computer vision method will be briefly described.

Figure 7:
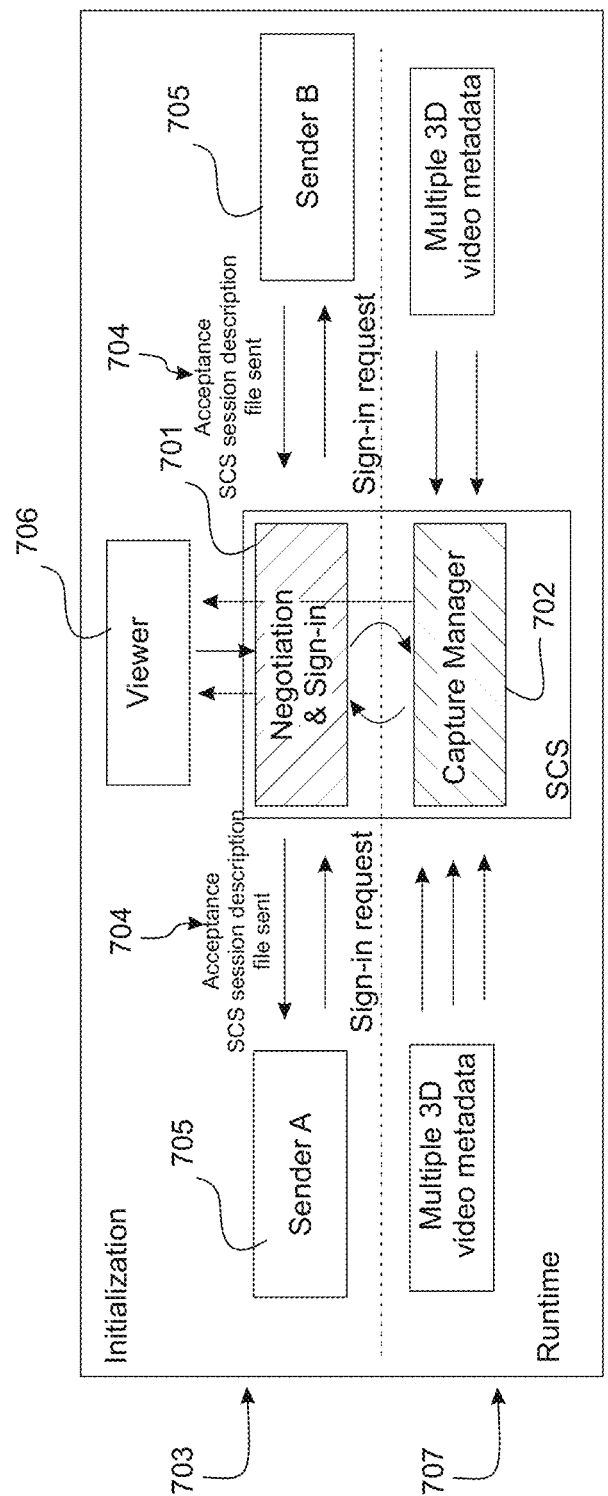
FIG. 7 shows an example illustration for a call flow according to an embodiment.

To summarize the call flow, the frame chunks containing the video and metadata are sent as video batches to the spatial computing server SCS. The spatial computing server SCS determines the spatial grouping. Thereafter, the reenactment of the scenes from the metadata can be done. The spatial computing server SCS can be a self-hosted or operator provided service which has an XR media storage and a media processing pipeline. The conversational call pipeline can be grouped into two main parts (1) Initialization and (2) Runtime, as is illustrated in FIG. 7. In the illustration of FIG. 7, the spatial computing server SCS comprises a negotiation and sign-in module 701 and a capture manager module 702.

In FIG. 7, there is depicted an initialization step 703 which deals with components that manages the connection establishment part of the call, whereby sender devices 705 make connection with the spatial computing server SCS and if all requirements are met, an SCS description file is sent back from the spatial computing server SCS to each sender device 705 as an acknowledgement.

In a negotiation and sign-in phase 704 each sender device 705 and viewer device 706, which participate the call, establish a connection with the spatial computing server SCS. When all compliances and requirements are met, the system then creates an SCS description file with various attributes related to the call. The system can then proceed to fill in available sections such as privacy, viewer type level of privacy agreed etc.

The initialization step 703 may also comprise generation of group unique identifiers (GUID) for the connected devices which can allow easy access by the spatial computing server SCS at runtime when the call starts. The spatial computing server SCS starts by creating a session, server, and camera GUIDs. Session GUID is required if multiple sessions are running in parallel on the spatial computing server SCS and affixed in the SCS file. The camera GUID may be a random number assigned or a MAC address (media access control address) for each entity with appended index number starting from, for example, 0 and incrementing by one for each device attached. The camera GUID is affixed as a part of the frame metadata that may be sent frequently. This process and enumeration technique is applicable to session GUID, server GUID and camera GUID where applicable.

Spatial grouping allows to know which camera GUID belongs to which multi-camera rig from sensors. This spatial grouping is done thanks to the method described earlier in this specification. Such method may ensure that each camera is uniquely identified by a pair of numbers: the group ID and camera GUID or in some other embodiment session ID-server ID-camera GUID. This implementation may allow easy and tractable retrieval directly form the SCS session description file during live calls.

In the second part is the runtime 707 when the call session is ongoing, 3D video metadata are being sent back and forth.

The capture management module 702 receives standard encoded 3D video metadata with SCS description file. In another embodiment, the session description file can reside only on the spatial computing server SCS so that runtime requests between the sender 705 and the receiver 706 are only relayed through appropriate transport protocol. The capture management 702 is tasked with retrieving the necessary data through the session description commands. To request a specific data, the group-camera GUID needs to be called through the SCS.

Figure 8:
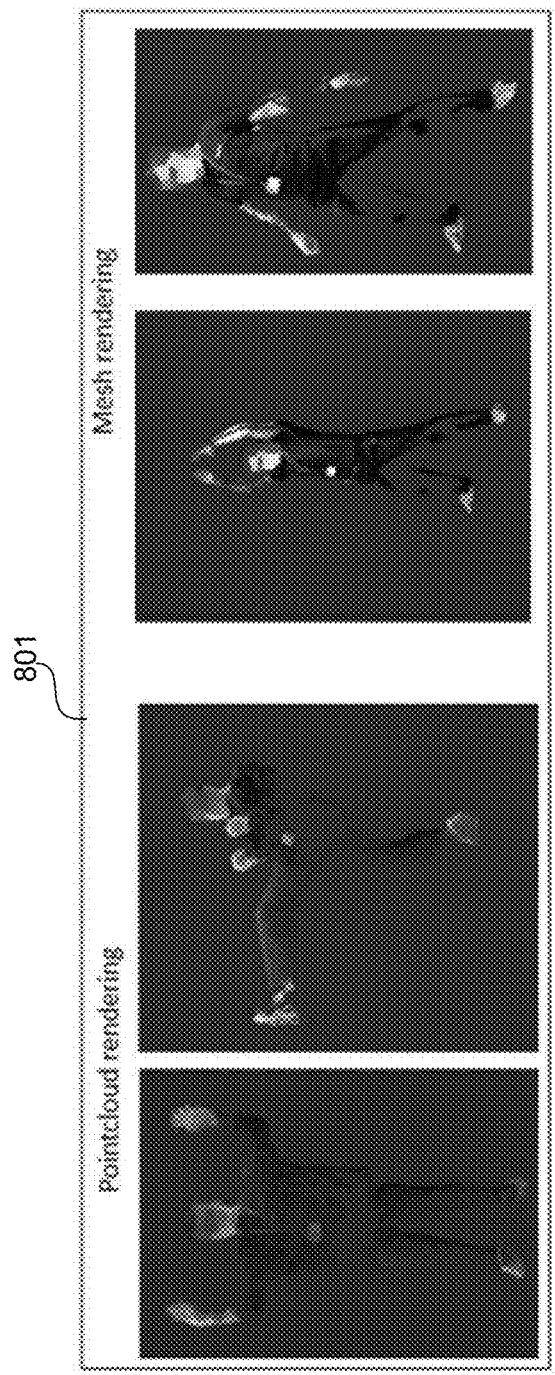
FIG. 8 shows an example of a complete point cloud representation from four partial view devices according to an embodiment.

Point cloud and/or mesh generation transforms images from individual sender devices 705 with partial view into a well aligned and full complete point cloud or textured mesh as shown in FIG. 8. Photogrammetry method may be used to transform those individual frames to point clouds using local extrinsic and intrinsic parameters, followed by aligning those point clouds using global extrinsic parameters.

Intrinsic and extrinsic parameters are used to generate a 3D point P(x,y,z) from depth images using triangulation techniques, thereafter triangle face indices may be determined from the depth points neighborhood.

View synthesis using global extrinsic handles real-time display of the point cloud or mesh reconstruction to the viewer 706. The global extrinsic parameters, rotation R and translation T from the SCS session description file are then used to transform a mesh point P(x,y,z) to a global coordinate point Q(x,y,z) e.g. as follows:

$$Q(x,y,z)=P(x,y,z)*R+T$$

where R is the rotation and T is the translation from the global extrinsic. This operation should be performed individually for each device to form an aligned point cloud in the same global coordinate system. In an embodiment, this global coordinate system, which will act as a reference, can be determined based on the viewer's 706 pose.

For the implementation of this part, since a matrix multiplication is expected to be performed inside the graphics shader to speed up the process, the rotation R and the translation T may be expanded to a 4×4 transformation matrix H. Thereafter the transformation matrix H, the global coordinate point Q and their triangle face indices are sent to a graphics shader. An example of combined point cloud and mesh view 801 from multiple device inputs based on an example implementation is shown in FIG. 8.

According to another embodiment, the use of GUID linked to the metadata allows to seamlessly re-identify devices coming back online when it is switched off during runtime. The SCS session description file is a linkage format file to popular video metadata, specifically providing linkage rather than holding those media files itself. It also relays update at runtime that may help a capture server (such as the spatial computing server SCS) to get needed data as requested between a sender 705 and a viewer 706. The viewer 706 can initiate several requests or updates during and/or before the call. Request may include, but are not limited to, encoder type, calibration parameters, display types, and also on live calibration.

The above described SCS functionality is not limited to the spatial computing server SCS but can be used for other form of network-based architectures.

In the following, some details of a cloud-based architecture will be provided.

At a certain time frame during the call, unsynchronized multiple devices may each individually send multiple partial view and associated metadata to the spatial computing server SCS and the spatial computing server SCS outputs a single complete view atlas and/or a subject and/or an object and/or a scene and/or a point cloud and/or a single complete view point cloud and/or a mesh.

A device may be unsynchronized in terms of spatial location, clock time, etc. The atlas can be RGBD in MIV, or point clouds or texture images alone or depth images alone.

At a certain time frame during the call, unsynchronized multiple devices over multiple locations each individually may send a partial view atlas and associated metadata to the spatial computing server SCS and the spatial computing server SCS outputs multiple complete view atlases and/or multiple complete view point clouds and/or meshes.

The architecture presented above may be practical for, e.g., quick home installations without a need for professional expertise or constrained professional volumetric studio setup. This architecture may provide a more friendly, easy on-the-go setup, less complicated system for end users, making it attractive for future conversational system. In addition, the described architecture includes an interesting Viewer-centric XR conversational properties capability. The described system introduces a flexibility capability to a viewer in the level of information they can request and have access. This property may be called as "Viewer-centric properties" for volumetric capture. The conventional method for data delivery under volumetric capture is sender-centric i.e. the sender decides what is needed and what needs to be transported to the viewer or server. In contrast, the Viewer-Centric approach may make it attractive by giving some level of control to the viewer. From compression perspective, this may lead to highly compressible volumetric system in which the viewer receives only the needed data from the server. For example, the viewer can send runtime requests through the spatial computing server SCS. The viewer can also decide to request just a minimal number of devices from a particular spatial grouping. This approach may help in simplifying the rendering process and the amount of data to be transported.

In the following, some further information regarding volumetric video will be provided.

There are alternatives to capture and represent a volumetric frame. The format used to capture and represent the volumetric frame depends on the process to be performed on it, and the target application using the volumetric frame. As a first example a volumetric frame can be represented as a point cloud. A point cloud is a set of unstructured points in 3D space, where each point is characterized by its position in a 3D coordinate system (e.g., Euclidean), and some corresponding attributes (e.g., color information provided as RGBA value, or normal vectors). As a second example, a volumetric frame can be represented as images, with or without depth, captured from multiple viewpoints in 3D space. In other words, the volumetric video can be represented by one or more view frames (where a view is a projection of a volumetric scene on to a plane (the camera plane) using a real or virtual camera with known/computed extrinsic and intrinsic). Each view may be represented by a number of components (e.g., geometry, color, transparency, and occupancy picture), which may be part of the geometry picture or represented separately. As a third example, a volumetric frame can be represented as a mesh. Mesh is a collection of points, called vertices, and connectivity information between vertices, called edges. Vertices along with edges form faces. The combination of vertices, edges and faces can uniquely approximate shapes of objects.

Depending on the capture, a volumetric frame can provide viewers the ability to navigate a scene with six degrees of freedom, i.e., both translational and rotational movement of their viewing pose (which includes yaw, pitch, and roll). The data to be coded for a volumetric frame can also be significant, as a volumetric frame can contain many numbers of objects, and the positioning and movement of these objects in the scene can result in many dis-occluded regions. Furthermore, the interaction of the light and materials in objects and surfaces in a volumetric frame can generate complex light fields that can produce texture variations for even a slight change of pose.

A sequence of volumetric frames is a volumetric video. Due to large amount of information, storage and transmission of a volumetric video requires compression. A way to compress a volumetric frame can be to project the 3D geometry and related attributes into a collection of 2D images along with additional associated metadata. The projected 2D images can then be coded using 2D video and image coding technologies, for example ISO/IEC 14496-10 (H.264/AVC) and ISO/IEC 23008-2 (H.265/HEVC). The metadata can be coded with technologies specified in specification such as ISO/IEC 23090-5. The coded images and the associated metadata can be stored or transmitted to a client that can decode and render the 3D volumetric frame.

In the following, a short reference of ISO/IEC 23090-5 Visual Volumetric Video-based Coding (V3C) and Video-based Point Cloud Compression (V-PCC) 2nd Edition is given. ISO/IEC 23090-5 specifies the syntax, semantics, and process for coding volumetric video. The specified syntax is designed to be generic, so that it can be reused for a variety of applications. Point clouds, immersive video with depth, and mesh representations can all use ISO/IEC 23090-5 standard with extensions that deal with the specific nature of the final representation. The purpose of the specification is to define how to decode and interpret the associated data (for example atlas data in ISO/IEC 23090-5) which tells a renderer how to interpret 2D frames to reconstruct a volumetric frame.

Two applications of V3C (ISO/IEC 23090-5) have been defined, V-PCC (ISO/IEC 23090-5) and MIV (ISO/IEC 23090-12). MIV and V-PCC use number of V3C syntax elements with a slightly modified semantics. An example on how the generic syntax element can be differently interpreted by the application is pdu_projection_id.

In case of V-PCC, the syntax element pdu_projection_id specifies the index of the projection plane for the patch. There can be 6 or 18 projection planes in V-PCC, and they are implicit, i.e., pre-determined. In case of MIV, pdu_projection_id corresponds to a view ID, i.e., identifies which view the patch originated from. View IDs and their related information is explicitly provided in MIV view parameters list and may be tailored for each content.

MPEG 3DG (ISO SC29 WG7) group has started a work on a third application of V3C—the mesh compression. It is also envisaged that mesh coding will re-use V3C syntax as much as possible and can also slightly modify the semantics.

To differentiate between applications of V3C bitstream that allow a client to properly interpret the decoded data, V3C uses the ptl_profile_toolset_idc parameter.

V3C bitstream is a sequence of bits that forms the representation of coded volumetric frames and the associated data making one or more coded V3C sequences (CVS). Where CVS is a sequence of bits identified and separated by appropriate delimiters, and is required to start with a VPS, includes a V3C unit, and contains one or more V3C units with atlas sub-bitstream or video sub-bitstream. Video sub-bitstream and atlas sub-bitstreams can be referred to as V3C sub-bitstreams. A V3C unit header in conjunction with VPS information identify which V3C sub-bitstream a V3C unit contains and how to interpret it. An example of this is shown herein below:

| | Descriptor |
|---|---|
| v3c_unit_header( ) { | |
|   vuh_unit_type | u(5) |
|   if( vuh_unit_type == V3C_AVD \|\| vuh_unit_type == V3C_GVD \|\| | |
|     vuh_unit_type == V3C_OVD \|\| vuh_unit_type == V3C_AD \|\| | |
|     vuh_unit_type == V3C_CAD \|\| vuh_unit_type == V3C_PVD ) | |
|     vuh_v3c_parameter_set_id | u(4) |
|   if( vuh_unit_type == V3C_AVD \|\| vuh_unit_type == V3C_GVD \|\| | |
|     vuh_unit_type == V3C_OVD \|\| vuh_unit_type == V3C_AD \|\| | |
|     vuh_unit_type == V3C_PVD ) | |
|     vuh_atlas_id | u(6) |
|   if( vuh_unit_type == V3C_AVD ) { | |
|     vuh_attribute_index | u(7) |
|     vuh_attribute_partition_index | u(5) |
|     vuh_map_index | u(4) |
|     vuh_auxiliary_video_flag | u(1) |
|   } else if( vuh_unit_type == V3C_GVD ) { | |
|     vuh_map_index | u(4) |
|     vuh_auxiliary_video_flag | u(1) |
|     vuh_reserved_zero_12bits | u(12) |
|   } else if( vuh_unit_type == V3C_OVD \|\| vuh_unit_type == V3C_AD \|\| | |
|     vuh_unit_type == V3C_PVD ) | |
|     vuh_reserved_zero_17bits | u(17) |
|   else if( vuh_unit_type == V3C_CAD ) | |
|     vuh_reserved_zero_23bits | u(23) |
|   else | |
|     vuh_reserved_zero_27bits | u(27) |
| } | |

V3C bitstream can be stored according to Annex C of ISO/IEC 23090-5, which specifies syntax and semantics of a sample stream format to be used by applications that deliver some or all of the V3C unit stream as an ordered stream of bytes or bits within which the locations of V3C unit boundaries need to be identifiable from patterns in the data.

CVS start with a VPS (V3C Parameter Set), which allows to interpret each V3C unit that vuh_v3c_parameter_set_id specifies the value of vps_v3c_parameter_set_id for the active V3C VPS. The VPS provides the following information about V3C bitstream among others:

Profile, tier, and level to which the bitstream is conformant.
Number of atlases that constitute to the V3C bitstream
Number of occupancies, geometry, attributes video-sub bitstreams
Number of maps for each geometry and attribute video components
Mapping information from attribute index to attribute type

| | Descriptor |
|---|---|
| v3c_parameter_set( numBytesInV3CPayload ) { | |
|   profile_tier_level( ) | |
|   vps_v3c_parameter_set_id | u(4) |
|   vps_reserved_zero_8bits | u(8) |
|   vps_atlas_count_minus1 | u(6) |
|   for( k = 0; k < vps_atlas_count_minus1 + 1; k++ ) { | |
|     vps_atlas_id[ k ] | u(6) |
|     j = vps_atlas_id[ k ] | |
|     vps_frame_width[ j ] | ue(v) |
|     vps_frame_height[ j ] | ue(v) |
|     vps_map_count_minus1[ j ] | u(4) |
|     if( vps_map_count_minus1[ j ] > 0 ) | |
|       vps_multiple_map_streams_present_flag[ j ] | u(1) |
|     vps_map_absolute_coding_enabled_flag[ j ][ 0 ] = 1 | |
|     vps_map_predictor_index_diff[ j ][ 0 ] = 0 | |
|     for( i = 1; i <= vps_map_count_minus1[ j ]; i++ ) { | |
|       if( vps_multiple_map_streams_present_flag[ j ] ) | |
|         vps_map_absolute_coding_enabled_flag[ j ][ i ] | u(1) |
|       else | |
|         vps_map_absolute_coding_enabled_flag[ j ][ i ] = 1 | |
|       if( vps_map_absolute_coding_enabled_flag[ j ][ i ] == 0 ) { | |
|         vps_map_predictor_index_diff[ j ][ i] | ue(v) |
|       } | |
|     } | |
|     vps_auxiliary_video_present_flag[ j ] | u(1) |
|     vps_occupancy_video_present_flag[ j ] | u(1) |
|     vps_geometry_video_present_flag[ j ] | u(1) |
|     vps_attribute_video_present_flag[ j ] | u(1) |
|     if( vps_occupancy_video_present_flag[ j ] ) | |
|       occupancy_information( j ) | |

-continued

| | Descriptor |
|---|---|
|     if( vps_geometry_video_present_flag[ j ] ) | |
|       geometry_information( j ) | |
|     if( vps_attribute_video_present_flag[ j ] ) | |
|       attribute_information( j ) | |
|   } | |
|   vps_extension_present_flag | u(1) |
|   if( vps_extension_present_flag ) { | |
|     vps_packing_information_present_flag | u(1) |
|     vps_miv_extension_present_flag | u(1) |
|     vps_extension_6bits | u(6) |
|   } | |
|   if( vps_packing_information_present_flag ) { | |
|     for( k = 0 ; k <= vps_atlas_count_minus1; k++ ) { | |
|       j = vps_atlas_id[ k ] | |
|       vps_packed_video_present_flag[ j ] | |
|       if( vps_packed_video_present_flag[ j ] ) | |
|         packing_information( j ) | |
|     } | |
|   } | |
|   if( vps_miv_extension_present_flag ) | |
|     vps_miv_extension( ) /*Specified in ISO/IEC 23090-12[1] */ | |
|   if( vps_extension_6bits ) { | |
|     vps_extension_length_minus1 | ue(v) |
|     for( j = 0; j < vps_extension_length_minus1 + 1; j++ ) { | |
|       vps_extension_data_byte | u(8) |
|     } | |
|   } | |
|   byte_alignment( ) | |
| } | |

[1]Under preparation. Stage at time of publication: ISO/IEC CD 23090-12:2020

In contrast to a fixed number of camera views and only one atlas in V-PCC, in MIV specification the number of cameras, camera extrinsic, camera intrinsic information is not fixed and may change during the V3C bitstream. In addition, the camera information may be shared among all atlases within V3C bitstream. In order to support such flexibility, the ISO/IEC 23090-5 $2^{nd}$ edition introduces a concept for common atlas data. Common atlas data is carried in a dedicated V3C unit type equal to V3C_CAD which contains a number of non-ACL NAL unit types, such as NAL_CASPS that carry common atlas sequence parameter set syntax structure, NAL_CAF_IDR and NAL_CAF_TRAIL that contain common atlas frames.

The V3C includes signalling mechanisms, through profile_tier_level syntax structure in VPS to support interoperability while restricting capabilities of V3C profiles. V3C also includes an initial set of tool constraint flags to indicate additional restrictions on profile. Currently the sub-profile indicator syntax element is always present, but the value of 0xFFFFFFFF indicates that no sub-profile is used, i.e., the full profile is supported.

| | Descriptor |
|---|---|
| profile_tier_level( ) { | |
|   ptl_tier_flag | u(1) |
|   ptl_profile_codec_group_idc | u(7) |
|   ptl_profile_toolset_idc | u(8) |
|   ptl_profile_reconstruction_idc | u(8) |
|   ptl_reserved_zero_16bits | u(16) |
|   ptl_max_decodes_idc | u(4) |
|   ptl_reserved_0xfff_12bits | u(12) |
|   ptl_level_idc | u(8) |
|   ptl_num_sub_profiles | u(6) |
|   ptl_extended_sub_profile_flag | u(1) |
|   for( i = 0; i < ptl_num_sub_profiles; i++ ) | |
|     ptl_sub_profile_idc[ i ] | u(v) |
|   ptl_toolset_constraints_present_flag | u(1) |

-continued

| | Descriptor |
|---|---|
|   if( ptl_toolset_constraints_present_flag ) | |
|     profile_toolset_constraints_information( ) | |
| } | |

A Real Time Transfer Protocol (RTP) is intended for an end-to-end, real-time transfer or streaming media and provides facilities for jitter compensation and detection of packet loss and out-of-order delivery. RTP allows data transfer to multiple destinations through IP multicast or to a specific destination through IP unicast. The majority of the RTP implementations are built on the User Datagram Protocol (UDP). Other transport protocols may also be utilized. RTP is used in together with other protocols such as H.323 and Real Time Streaming Protocol RTSP.

The RTP specification describes two protocols: RTP and RTCP. RTP is used for the transfer of multimedia data, and the RTCP is used to periodically send control information and QoS parameters.

RTP sessions may be initiated between client and server using a signalling protocol, such as H.323, the Session Initiation Protocol (SIP), or RTSP. These protocols may use the Session Description Protocol (RFC 8866) to specify the parameters for the sessions.

RTP is designed to carry a multitude of multimedia formats, which permits the development of new formats without revising the RTP standard. To this end, the information required by a specific application of the protocol is not included in the generic RTP header. For a class of applications (e.g., audio, video), an RTP profile may be defined. For a media format (e.g., a specific video coding format), an associated RTP payload format may be defined. Every instantiation of RTP in a particular application may require a profile and payload format specifications.

The profile defines the codecs used to encode the payload data and their mapping to payload format codecs in the protocol field Payload Type (PT) of the RTP header.

For example, RTP profile for audio and video conferences with minimal control is defined in RFC 3551. The profile defines a set of static payload type assignments, and a dynamic mechanism for mapping between a payload format, and a PT value using the Session Description Protocol. The latter mechanism is used for newer video codec such as RTP payload format for H.264 Video defined in RFC 6184 or RTP Payload Format for High Efficiency Video Coding (HEVC) defined in RFC 7798.

An RTP session is established for each multimedia stream. Audio and video streams may use separate RTP sessions, enabling a receiver to selectively receive components of a particular stream. The RTP specification recommends even port number for RTP, and the use of the next odd port number of the associated RTCP session. A single port can be used for RTP and RTCP in applications that multiplex the protocols.

RTP packets are created at the application layer and handed to the transport layer for delivery. Each unit of RTP media data created by an application begins with the RTP packet header.

The RTP header has a minimum size of 12 bytes. After the header, optional header extensions may be present. This is followed by the RTP payload, the format of which is determined by the particular class of application. The fields in the header are as follows:

- Version: (2 bits) Indicates the version of the protocol.
- P (Padding): (1 bit) Used to indicate if there are extra padding bytes at the end of the RTP packet.
- X (Extension): (1 bit) Indicates the presence of an extension header between the header and payload data. The extension header is application or profile specific.
- CC (CSRC count): (4 bits) Contains the number of CSRC identifiers that follow the SSRC
- M (Marker): (1 bit) Signalling used at the application level in a profile-specific manner. If it is set, it means that the current data has some special relevance for the application.
- PT (Payload type): (7 bits) Indicates the format of the payload and thus determines its interpretation by the application.
- Sequence number: (16 bits) The sequence number is incremented for each RTP data packet sent and is to be used by the receiver to detect packet loss and to accommodate out-of-order delivery.
- Timestamp: (32 bits) Used by the receiver to play back the received samples at appropriate time and interval. When several media streams are present, the timestamps may be independent in each stream. The granularity of the timing is application specific. For example, video stream may use a 90 KHz clock. The clock granularity is one of the details that is specified in the RTP profile for an application.
- SSRC: (32 bits) Synchronization source identifier uniquely identifies the source of the stream. The synchronization sources within the same RTP session will be unique.
- CSRC: (32 bits each) Contributing source IDs enumerate contributing sources to a stream which has been generated from multiple sources.
- Header extension: (optional, presence indicated by Extension field) The first 32-bit word contains a profile-specific identifier (16 bits) and a length specifier (16 bits) that indicates the length of the extension in 32-bit units, excluding the 32 bits of the extension header.

In this disclosure, the Session Description Protocol (SDP) is used as an example of a session specific file format. SDP is a format for describing multimedia communication sessions for the purposes of announcement and invitation. Its predominant use is in support of conversational and streaming media applications. SDP does not deliver any media streams itself, but is used between endpoints for negotiation of network metrics, media types, and other associated properties. The set of properties and parameters is called a session profile. SDP is extensible for the support of new media types and formats.

The Session Description Protocol describes a session as a group of fields in a text-based format, one field per line. The form of each field is as follows:

<character>=<value><CR><LF> where <character> is a single case-sensitive character and <value> is structured text in a format that depends on the character. Values may be UTF-8 encoded. Whitespace is not allowed immediately to either side of the equal sign.

Session descriptions consist of three sections: session, timing, and media descriptions. Each description may contain multiple timing and media descriptions. Names are only unique within the associated syntactic construct.

Fields appear in the order, shown below; optional fields are marked with an asterisk:

- v=(protocol version number, currently only 0)
- o=(originator and session identifier: username, id, version number, network address)
- s=(session name: mandatory with at least one UTF-8-encoded character)
- i=* (session title or short information)
- u=* (URI of description)
- e=* (zero or more email address with optional name of contacts)
- p=* (zero or more phone number with optional name of contacts)
- c=* (connection information—not required if included in all media)
- b=* (zero or more bandwidth information lines)
- One or more time descriptions ("t=" and "r=" lines; see below)
- z=* (time zone adjustments)
- k=* (encryption key)
- a=* (zero or more session attribute lines)
- Zero or more Media descriptions (each one starting by an "m=" line; see below)

Time Description (Mandatory):
- t=(time the session is active)
- r=* (zero or more repeat times)

Media Description (Optional):
- m=(media name and transport address)
- i=* (media title or information field)
- c=* (connection information—optional if included at session level)
- b=* (zero or more bandwidth information lines)
- k=* (encryption key)
- a=* (zero or more media attribute lines—overriding the Session attribute lines)

Below is a sample session description from RFC 4566. This session is originated by the user "jdoe" at IPv4 address 10.47.16.5. Its name is "SDP Seminar" and extended session information ("A Seminar on the session description protocol") is included along with a link for additional information and an email address to contact the responsible party, Jane Doe. This session is specified to last two hours using NTP timestamps, with a connection address (which indicates the address clients must connect to or—when a multicast address is provided, as it is here—subscribe to) specified as IPv4 224.2.17.12 with a TTL of 127. Recipients of this session description are instructed to only receive media. Two media descriptions are provided, both using RTP Audio Video Profile. The first is an audio stream on port 49170 using RTP/AVP payload type 0 (defined by RFC 3551 as PCMU), and the second is a video stream on port 51372 using RTP/AVP payload type 99 (defined as "dynamic"). Finally, an attribute is included which maps RTP/AVP payload type 99 to format h263-1998 with a 90 KHz clock rate. RTCP ports for the audio and video streams of 49171 and 51373 respectively are implied.

v=0
o=jdoe 2890844526 2890842807 IN IP4 10.47.16.5
s=SDP Seminar
i=A Seminar on the session description protocol
u=http://www.example.com/seminars/sdp.pdf
e=j.doe@example.com (Jane Doe)
C=IN IP4 224.2.17.12/127
t=2873397496 2873404696
a=recvonly
m=audio 49170 RTP/AVP 0
m=video 51372 RTP/AVP 99
a=rtpmap: 99 h263-1998/90000

SDP uses attributes to extend the core protocol. Attributes can appear within the Session or Media sections and are scoped accordingly as session-level or media-level. New attributes can be added to the standard through registration with IANA. A media description may contain any number of "a=" lines (attribute-fields) that are media description specific. Session-level attributes convey additional information that applies to the session as a whole rather than to individual media descriptions.

Attributes are either properties or values:
a=<attribute-name>
a=<attribute-name>:<attribute-value>

Examples of attributes defined in RFC8866 are "rtpmap" and "fmpt".

"rtpmap" attribute maps from an RTP payload type number (as used in an "m=" line) to an encoding name denoting the payload format to be used. It also provides information on the clock rate and encoding parameters. Up to one "a=rtpmap:" attribute can be defined for each media format specified. This can be the following:

m=audio 49230 RTP/AVP 96 97 98
a=rtpmap: 96 L8/8000
a=rtpmap: 97 L16/8000
a=rtpmap: 98 L16/11025/2

In the example above, the media types are "audio/L8" and "audio/L16".

Parameters added to an "a=rtpmap:" attribute may only be those required for a session directory to make the choice of appropriate media to participate in a session. Codec-specific parameters may be added in other attributes, for example, "fmtp".

"fmtp" attribute allows parameters that are specific to a particular format to be conveyed in a way that SDP does not have to understand them. The format can be one of the formats specified for the media. Format-specific parameters, semicolon separated, may be any set of parameters required to be conveyed by SDP and given unchanged to the media tool that will use this format. At most one instance of this attribute is allowed for each format. An example is:

a=fmtp: 96 profile-level-id=42e016;max-mbps=108000;
max-fs=3600

For example RFC7798 defines the following sprop-vps, sprop-sps, sprop-pps, profile-space, profile-id, tier-flag, level-id, interop-constraints, profile-compatibility-indicator, sprop-sub-layer-id, recv-sub-layer-id, max-recv-level-id, tx-mode, max-lsr, max-lps, max-cpb, max-dpb, max-br, max-tr, max-tc, max-fps, sprop-max-don-diff, sprop-depack-buf-nalus, sprop-depack-buf-bytes, depack-buf-cap, sprop-seg-mentation-id, sprop-spatial-segmentation-idc, dec-parallel-cap, and include-dph.

While defining a payload type of a given media, quite often an RFC also performs Media Type registration. Such registration incudes type name (i.e., video, audio, application, etc.), subtype name (e.g., H264, H265, mp4, etc.), required parameters, as well as optional parameters. The register types are maintained by Internet Assigned Numbers Authority (IANA). The media types of registration can be extended by registration of new optional parameters.

Media types and their parameters can be mapped to a specific description protocol. For example, while defining a payload type of a given media, an RFC may provide information on how parameters of a given media type can be mapped to SDP. Such mapping is not restricted to SDP and can be defined for other protocols, e.g., XML, DASH MPD.

Like any coding technology, also V3C coding makes the compromise between the complexity and the coding efficiency. To achieve higher coding efficiency in V3C, the encoder must perform more calculation to find optimal patch segmentation which will reduce the amount of data as well allow better video compression. For example, in a real-time communication, the complexity of the encoding side needs to be minimized to ensure the lowest possible latency, which can provide acceptable end user experience.

V3C encoder complexity can be reduced to minimum, when input camera feeds are encoded as video components directly, without any segmentation. This results in static atlas data that corresponds to capture camera rig parameters like locations, orientations and the intrinsic. Currently there is no efficient means for signalling this static atlas data. Instead, the static atlas data requires its own stream, e.g., RTP stream, to be established in order to signal atlas data to the client only once in the beginning of the stream. This wastes network resources and complicates client device implementations.

The present embodiments relate to a method and an apparatus for low complexity—low delay V3C bitstream delivery for real-time applications. The method for encoding according to an embodiment comprises:

creating a V3C bitstream, where atlas related information is pre-calculated (e.g., through calibration of the capturing system);
encoding video components (occupancy, geometry, attributes) either as
packed video bitstream, or
separate video bitstream;
creating V3C atlas information and/or V3C common atlas information according to the atlas related information, wherein the V3C atlas information and/or V3C common atlas information is static for the duration of the V3C bitstream; and storing the information either as
optional media type parameters of V3C component (e.g., packed video) and map them to a given media type in a description document, e.g., SDP, XML, MPD, or
as SDP parameters;
sending V3C video component(s) over a network, e.g., using a real-time delivery protocol such RTP; and sending static V3C atlas information and/or V3C common atlas information through out-of-band information (e.g., SDP).

The method for decoding according to an embodiment comprises:

receiving the out of band information on static V3C atlas information and/or V3C common atlas information, and V3C video stream(s); and rendering the V3C content.

In this disclosure static V3C atlas information and/or V3C common atlas information is referred to as "static out-of-band V3C information" or "static atlas data" or "static atlas information" interchangeably.

Figure 5:
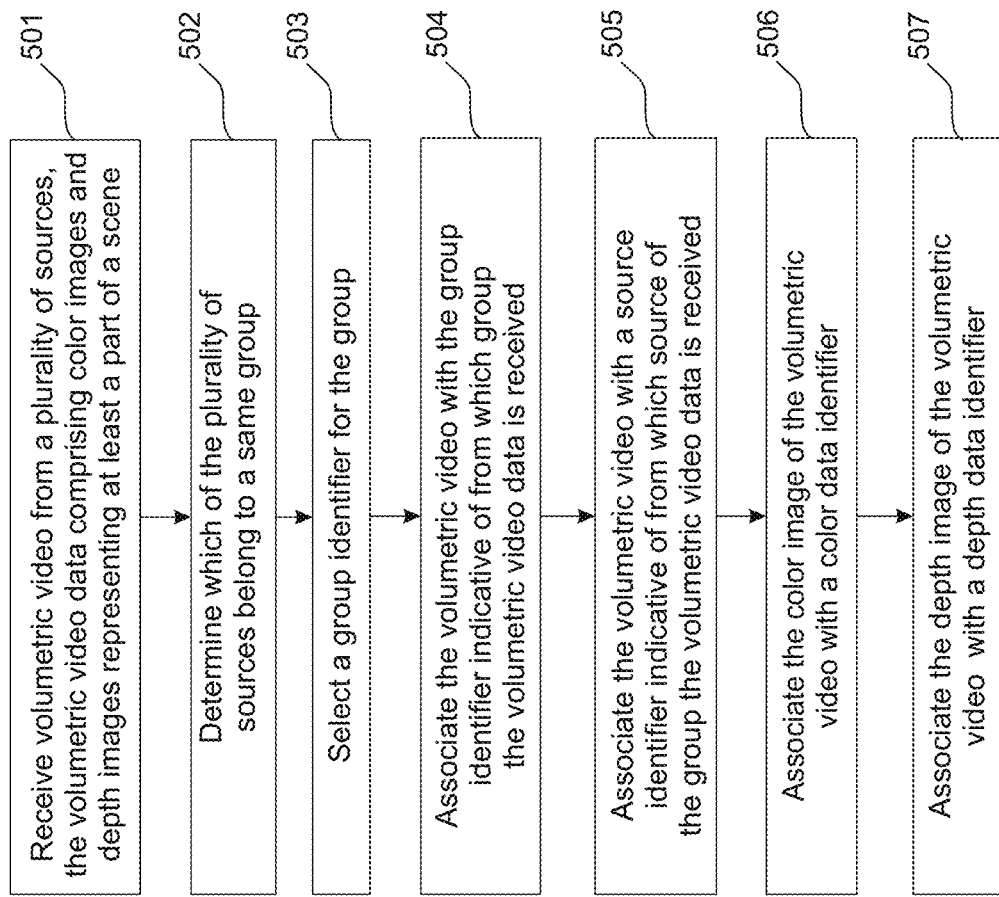
FIG. 5 is a flowchart illustrating a method according to an embodiment.

The memory and the computer program code are configured to, with the at least one processor, cause the apparatus to perform the method of FIG. 5 according to various embodiments.

Figure 9:
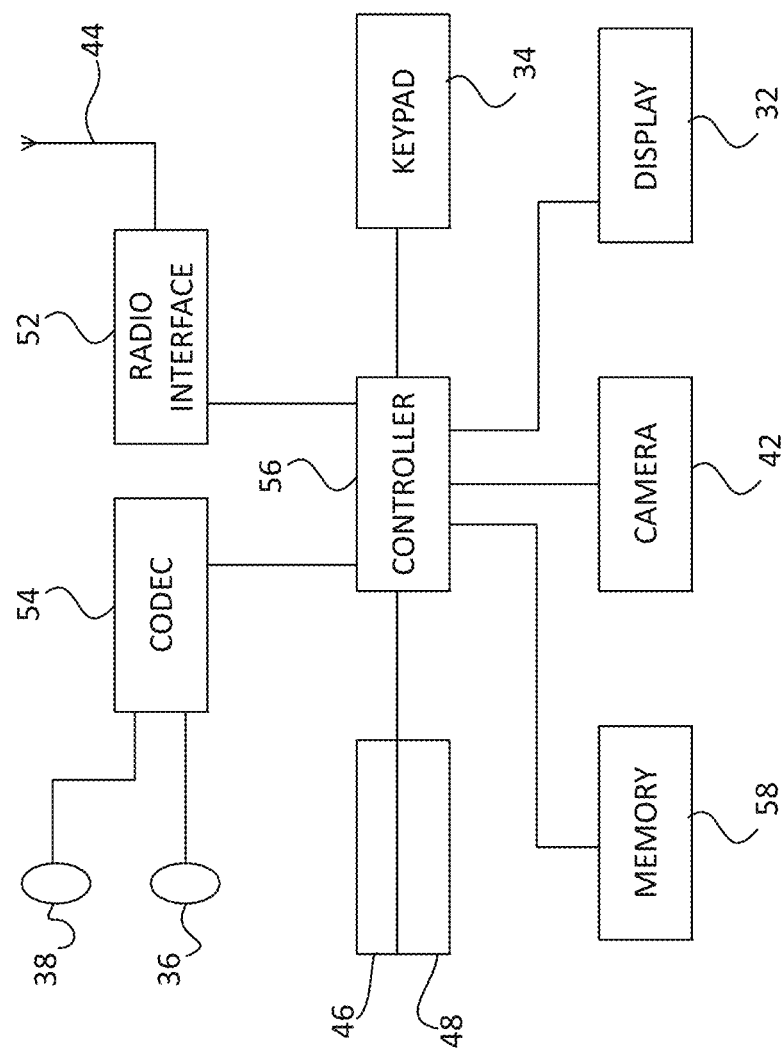
FIG. 9 shows an example of an apparatus.

FIG. 9 shows a block diagram of a video coding system according to an example embodiment as a schematic block diagram of an electronic device 50, which may incorporate a codec. In some embodiments the electronic device may comprise an encoder or a decoder. The electronic device 50 may for example be a mobile terminal or a user equipment of a wireless communication system or a camera device. The electronic device 50 may be also comprised at a local or a remote server or a graphics processing unit of a computer. The device may be also comprised as part of a head-mounted display device. The apparatus 50 may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera 42 capable of recording or capturing images and/or video. The camera 42 may be a multi-lens camera system having at least two camera sensors. The camera is capable of recording or detecting individual frames which are then passed to the codec 54 or the controller for processing. The apparatus may receive the video and/or image data for processing from another device prior to transmission and/or storage.

The apparatus 50 may comprise a controller 56 or processor for controlling the apparatus 50. The apparatus or the controller 56 may comprise one or more processors or processor circuitry and be connected to memory 58 which may store data in the form of image, video and/or audio data, and/or may also store instructions for implementation on the controller 56 or to be executed by the processors or the processor circuitry. The controller 56 may further be connected to codec circuitry 54 suitable for carrying out coding and decoding of image, video and/or audio data or assisting in coding and decoding carried out by the controller.

The apparatus 50 may further comprise a card reader 48 and a smart card 46, for example a UICC (Universal Integrated Circuit Card) and UICC reader for providing user information and being suitable for providing authentication information for authentication and authorization of the user at a network. The apparatus 50 may comprise radio interface circuitry 52 connected to the controller and suitable for generating wireless communication signals for example for communication with a cellular communications network, a wireless communications system, or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es). The apparatus may comprise one or more wired interfaces configured to transmit and/or receive data over a wired connection, for example an electrical cable or an optical fiber connection.

The various embodiments can be implemented with the help of computer program code that resides in a memory and causes the relevant apparatuses to carry out the method. For example, a device may comprise circuitry and electronics for handling, receiving, and transmitting data, computer program code in a memory, and a processor that, when running the computer program code, causes the device to carry out the features of an embodiment. Yet further, a network device like a server may comprise circuitry and electronics for handling, receiving, and transmitting data, computer program code in a memory, and a processor that, when running the computer program code, causes the network device to carry out the features of various embodiments.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus for encoding comprising at least one processor, memory including computer program code, the memory and the computer program code configured to, with the at least one processor, cause the apparatus to:

receive volumetric video data from a plurality of sources, the volumetric video data comprising one or more color images and one or more depth images representing at least a part of a scene;

determine which of the plurality of sources belong to a same group;

select a group identifier for the group;

associate the volumetric video data with the group identifier indicative of from which group the volumetric video data is received;

associate the volumetric video data with a source identifier indicative of from which source of the group the volumetric video data is received;

associate the one or more color images of the volumetric video data with a color data identifier; and associate the one or more depth images of the volumetric video data with a depth data identifier.

2. The apparatus according to claim 1 further caused to:
send the volumetric video data and the identifiers associated with the volumetric video data to a viewer device.

3. The apparatus according to claim 1 further caused to:
reproduce the volumetric video data; and
send the reproduced volumetric video data to a viewer device.

4. The apparatus according to claim 1 further caused to:
include the group identifier and the source identifier in a spatial computing service session description file.

5. The apparatus according to claim 4 further caused to:
obtain intrinsic and extrinsic parameters from the plurality of sources; and
include the intrinsic and extrinsic parameters in the spatial computing service session description file.

6. The apparatus according to claim 1, wherein sources fixed with a same device rig are determined to belong to the same group.

7. The apparatus according to claim 1 further caused to:
initiate a call between two or more sources; and
create a spatial computing service session description file for relaying signaling information and metadata between the sources of the call.

8. The apparatus according to claim 7 further caused to:
segment multimedia information related to the volumetric video data from the plurality of sources into infrequent chunks and frequent chunks;
send the infrequent chunks at least during the initiation of the call; and
send the frequent chunks regularly during the call.

9. The apparatus according to claim 8, wherein the infrequent chunks include one or more of the following:
a group index,
intrinsic parameters,
extrinsic parameters, and
video information; and
the frequent chunks include one or more of the following:
batch information specifying maximum number of frames that will be sent as a part of a video batch and including none or at least one of a local time stamp for the video frame, and an exposure time,
one or more frames of the volumetric video data, and
audio data of the volumetric video data.

10. A method comprising:
receiving volumetric video data from a plurality of sources, the volumetric video data comprising one or more color images and one or more depth images representing at least a part of a scene;
determining which of the plurality of sources belong to a same group;
selecting a group identifier for the group;
associating the volumetric video data with the group identifier indicative of from which group the volumetric video data is received;
associating the volumetric video data with a source identifier indicative of from which source of the group the volumetric video data is received;
associating the one or more color images of the volumetric video data with a color data identifier; and
associating the one or more depth images of the volumetric video data with a depth data identifier.

11. The method according to claim 10 further comprising:
sending the volumetric video data and the identifiers associated with the volumetric video data to a viewer device.

12. The method according to claim 10 further comprising:
reproducing the volumetric video data; and
sending the reproduced volumetric video data to a viewer device.

13. The method according to claim 10 further comprising:
including the group identifier and the source identifier in a spatial computing service session description file.

14. The method according to claim 13 further comprising:
obtaining intrinsic and extrinsic parameters from the plurality of sources; and
including the intrinsic and extrinsic parameters in the spatial computing service session description file.

15. The method according to claim 10, wherein sources fixed with a same device rig are determined to belong to the same group.

16. The method according to claim 10 further comprising:
initiating a call between two or more sources; and
creating a spatial computing service session description file for relaying signaling information and metadata between the sources of the call.

17. The method according to claim 16 further comprising:
segmenting multimedia information related to the volumetric video data from the plurality of sources into infrequent chunks and frequent chunks;
sending the infrequent chunks at least during the initiation of the call; and
sending the frequent chunks regularly during the call.

18. The method according to claim 17, wherein:
the infrequent chunks include one or more of the following:
a group index,
intrinsic parameters,
extrinsic parameters, and
video information; and
the frequent chunks include one or more of the following:
batch information specifying maximum number of frames that will be sent as a part of a video batch and including none or at least one of a local time stamp for the video frame, and an exposure time,
one or more frames of the volumetric video data, and
audio data of the volumetric video data.

* * * * *